March 29, 1966     O. C. MOLL     3,242,578
COMPACT LAYOUT TOOL
Filed Dec. 14, 1964     2 Sheets-Sheet 1
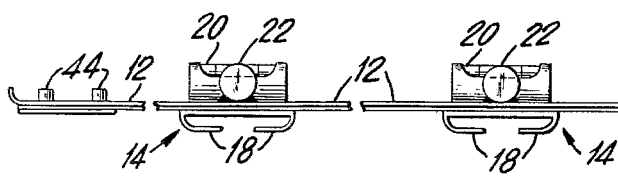
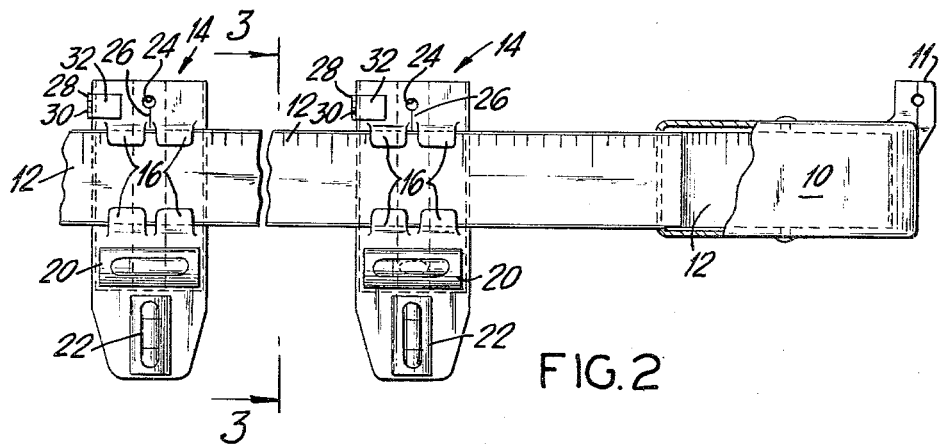
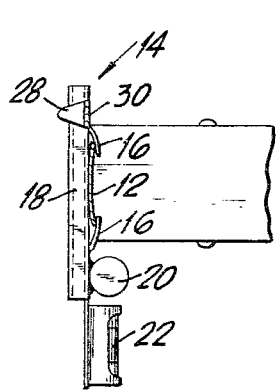
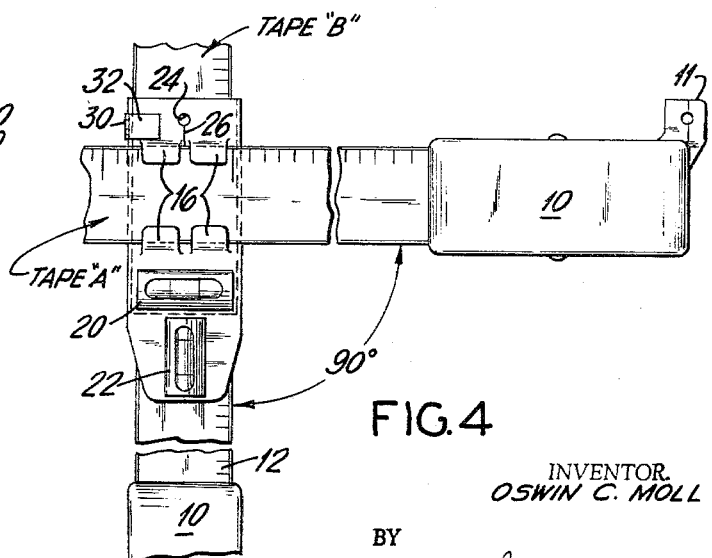
INVENTOR.
OSWIN C. MOLL
BY
Leonard H. King
ATTORNEY.

United States Patent Office 3,242,578
Patented Mar. 29, 1966

3,242,578
COMPACT LAYOUT TOOL
Oswin C. Moll, 446 E. Broad St., Quakertown, Pa.
Filed Dec. 14, 1964, Ser. No. 418,163
10 Claims. (Cl. 33—88)

This invention relates to a compact layout tool and more particularly to a combination tool employing an extensible, flexible, metal tape ruler.

A need has long existed for a compact layout tool capable of handling large dimensions. The trade has generally accepted carpenter squares having 2 foot and 3 foot legs and 6 foot levels. Larger devices are manifestly too cumbersome to transport. The present invention provides a compact tool but a few inches long which can make an accurate layout of up to 100 feet.

Carpenters, and in fact many other skilled workers employed in the construction trades, as well as amateur hobbyists, find to desirable for any one of a number of reasons to have several tools combined into one. First, the function of each of the combined tools is generally related. That is, if the individual requires a measuring device, he is quite likely to require either a square or a level or both devices on the same job. Secondly, some of the devices in the combination, particularly the square, are quite large and by themselves are difficult to accommodate in the average size tool storage box. The prior art has examples of combination tools but, to the best of my knowledge, does not either combine the particular devices to be disclosed hereinafter or combine the devices in a compact manner.

Accordingly, it is an object of the present invention to provide an improved combination tool.

Another object is to provide a combination tool comprising a level, a square, and measurement transfer means.

An additional object is to provide a combination tool of the aforementioned type that utilizes a flexible, coiled metal measuring tape.

A further object is to provide a combination tool of the aforementioned type that is compact and easy to store.

A still further object is to provide means for removably attaching a plurality of tools to a flexible, coiled metal measuring tape to thereby convert the tape into a combination tool.

Another object is to provide a low cost, easily manufactured combination tool.

A further object is to provide means for removably attaching a plurality of tools to an existing flexible coiled metal measuring tape to thereby convert the tape into a combination tool.

These and other features, objects and advantages of the invention will, in part, be pointed out with particularity and will, in part, become obvious from the following more detailed description of the invention, taken in conjunction with the accompanying drawing which forms an integral part thereof.

In the various figures of the drawing like reference characters designate like parts.

In the drawing:

FIG. 1 is a front elevation view of the present invention illustrating a particular combination of tools;

FIG. 2 is a partially broken away plan view taken along line 2—2 of FIG. 1;

FIG. 3 is a sectional elevation view taken along line 3—3 of FIG. 2;

FIG. 4 is a view similar to FIG. 2 illustrating the present invention employed with a different combination of tools;

Figure 5:
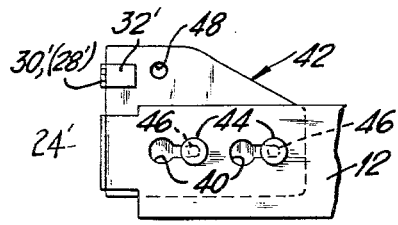
FIG. 5 is a plan view of the modified free end of the measuring tape.

Referring now to the drawing, there is shown in FIG. 1 and FIG. 2, one possible combination of tools available by the use of the present invention. Hollow housing 10, having an apertured, external tab 11 lying in the plane of the housing base, contains a wound coil of flexible metal tape 12. The free end of the coil is adapted to be withdrawn from the housing. Conventional markings are provided on the upper, slightly concave surface of tape 12 so that by itself the tape may be used to measure lengths.

One or more multipurpose slide members 14 are provided for the tape 12 so that, in combination therewith, a variety of tools may be assembled. One common feature of all the combinations of tools is the collapsibility and small storage space required by virtue of the flexibility and coiling of the tape. Another feature common to all tool combinations is the arcuate and snug fit between the slides and the tape resulting from the concavity and inherent resilience of the metal tape. As will be described more fully hereinafter with regard to one particular embodiment, the resiliency of the concave tape permits the slide member to be accurately maintained at a right angle to the tape.

Slide member 14 is provided with a plurality of tongues 16 which may be formed by outwardly displacing selected portions of the top surface thereof. Tongues 16 in the assembled condition are transversely arranged about the outwardly extending portion of tape 12, and are sufficiently long and closely spaced so that the slide member 14 does not rock on the tape and lose its perpendicularity thereto. Slide member 14 is also provided with a pair of downwardly and inwardly positioned opposed flange members 18, the function of which will be described hereinafter in conjunction with the tool combination illustrated in FIG. 4.

The term "level" as used in mechanics refers to any direction perpendicular to the force of gravity. Strictly speaking, it is not synonymous with "horizontal" because of the earth's curvature. However, the difference is negligible for the relatively short distances for which this tool would be employed.

The simplest sensing device known for this device is the spirit level, disclosed herein. Of course more complex sensing devices may be substituted. The spirit level depends on the simple principle that an air bubble seeks the highest point of the container holding the liquid in which it is formed. The glass tube of a level is slightly curved like a sausage with the convex side upward. If such a tube is supported on a rigid base, the bubble contained therein always comes to equilibrium at the same point whenever the base has the same given inclination to the horizontal. Thus by providing two sets of spirit levels 20 and 22, each set being perpendicular to the other, the tape may be readily adjusted to a horizontal position, or in a vertical position, depending on the particular set of levels being used.

Mutually perpendicular bubble level vials 20 and 22 are positioned on the lower end of the top surface of each slide member 14. When the slide member is assembled, vial 20 is parallel to tape 12 and vial 22 is perpendicular to tape 12. Further, at the upper end of the top surface of each slide member 14, an aperture 24 is formed together with inwardly extending scribe mark 26. Finally, each slide member 14 is provided with a gaging pin 28 adapted to extend rearwardly in a plane perpendicular to that of the tape 12. A convenient way of mounting the pin is by hinge 30 which is secured to slide member 14 by plate 32. In this manner, the pin is moved out of the way when it is not in use.

Bearing in mind the foregoing description of the structure of the present apparatus, several modes of operation will now be described. When it is necessary to accurately transfer dimensions such as the mounting hole spacing of a motor base or the like, a pair of slide members 14 are used. Pins 28 are snapped to a rearward facing position and members 14 are slid along tape 12 until the pins engage the holes in the motor base. Since the tongues 16 of members 14 are dimensioned so that they are movable but do not slide freely, the desired setting will be retained. The tool is then taken to the place where the motor is to be installed and the hole spacing dimension is transferred by means of apertures 24 which have the same dimensional relationship to each other as the pins. Any suitable marking instrument such as a pencil or a punch may be inserted in the apertures.

In the transfer of spacing dimensions, it is not necessary to know the exact measurement between holes as long as the setting does not change. However, there are some instances where it is desirable to have this linear information. For this purpose, scribe marks 26 are provided, the scribe marks extending from the apertures to the calibrations on tape 12. Thus, regardless of where the slides are positioned on the tape, the distance therebetween may readily be established merely by subtracting from each other the two dimensions indicated by scribe marks 26.

Bubble levels 20 and 22 are used in a conventional manner when the work is to be done on a vertical or nearly vertical wall. That is, bubble level 20 indicates the horizontal attitude of the tool and bubble level 22 indicates the vertical attitude of the tool when held in the vertical position. The present invention provides an important advantage over the standard carpenter's level. Because the coiled tape 12 is generally in excess of 12 feet, a perfectly level line can be drawn over a great distance. Moreover, only one man is required to accomplish the task. The housing 10 can be hung on the wall by driving a nail or the like through apertured tab 11 and then extending the tape as far as is required with a slide member positioned at the other extremity of the tape. A nail is then driven through aperture 24 when level 20 indicates that tape 12 is horizontal. Alternatively, the tape and the housing may be held on the wall by using apertures 24 of two extremely positioned slide members.

Other means may also be employed to temporarily hold the combination tool against the wall such as magnets if the wall is such that it will attract them or small suction cups. Since tapes of this type are readily available in lengths up to 100 feet, the one man usage of the present invention will be readily apparent.

FIG. 4 illustrates the present invention including a collapsible, easily stored carpenter's square. A first coiled flexible tape A is inserted in tongues 16 of a slide member 14 in the same manner as described in connection with the foregoing embodiment. A second coiled flexible tape B is then placed within flanges 18 of member 14. It will be seen that by the construction of slide members 14, tapes A and B are held precisely at right angles to each other. The square may be stored with both of the tapes collapsed and in their respective housings so that a minimum of space is required. Alternatively one of the tapes may be removed from the slide member for storage purposes. As an extension of the present invention, still another combination tool may be formed by providing a plurality of slide members on each tape A and B of the square so that hole spacing dimensions may be transferred simultaneously from two, mutually perpendicular directions in a single plane. It is also a possibility, although somewhat less practical, to assemble four flexible tapes to form an adjustably sized polygon. Of course, the sides would be parallel and perpendicular to each other and all the above mentioned features, such as dimension transfer, would still be available.

Figure 6:
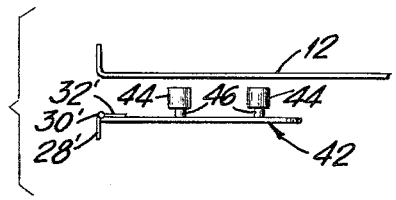
FIG. 6 is an exploded side elevation view of the modified free end of the measuring tape together with a removable clip therefor.

Simple yet effective means are provided to prevent the slide members from accidentally being dislodged from the tape. The attachment for the end of the tape is shown in FIG. 5 and FIG. 6. A pair of keyhole-shaped apertures 40 are formed in the free end of the measuring tape. Clip 42 is provided with a pair of upstanding studs each having an undercut portion 46 of reduced diameter. Studs 44 are inserted in the circular portion of apertures 40, and clip 42 is slid on the tape until the undercut portions 46 of studs 44 engage the narrow end of the apertures. The clip is thereby removably retained on the free end of the tape. Slide members 14 may then be placed on or taken off of the tape as desired and there is little danger that they will inadvertently become dislodged.

As a further convenience in transferring measurements, clip 42 is provided with a pin 28' which is hinged at 30' to plate 32'. Aperture 48 is also provided in clip 42. Since pin 28' is coincident with the zero point of the flexible tape exact dimensions may be calculated between that point and one of the other pins which, as may be seen in the drawings, line up with one of the tape calibrations. Further, dimension transfer may be made between pin 28' and any other pin 28 as well as between aperture 48 and any other aperture 24 in the manner described hereinbefore.

Figure 7:
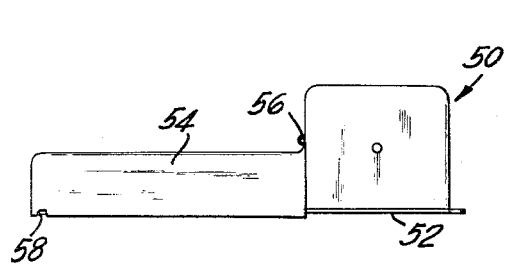
FIG. 7 is a side elevation of an alternative housing for both the coiled metal tape and the attachments thereto.
Figure 8:
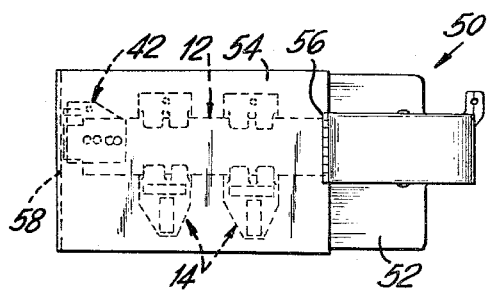
FIG. 8 is a plan view of the FIG. 7 housing.

FIG. 7 and FIG. 8 illustrate still another embodiment of the present invention wherein a housing is provided that permits the storage of two or more attachments for the coiled tape. Since the structure and mode of operation of the layout tool are the same as the previous embodiments, it will not be necessary to described them again. It should be understood that all of the advantages and features of the previous embodiments may readily be incorporated in the embodiment now to be described.

Housing 50, containing a coiled length of flexible metal tape, is provided with an enlarged, integrally formed base member 52 which extends outwardly from the direction of tape movement. A cover portion 54 is movably secured to the housing by means of transverse hinge 56 and is further provided with an integral retaining clip 58 at its lower, outer end. Both the cover portion and the base member are of a sufficient size to contain at least two of the aforementioned slide members and preferably an end clip such as described hereinabove. Thus it will be seen that a complete, self-contained tool is provided wherein it it not necessary to remove the slide members. This construction makes for compact storage of the tool and its attachments and further assures that the attachments will not be damaged or destroyed.

Figure 9:
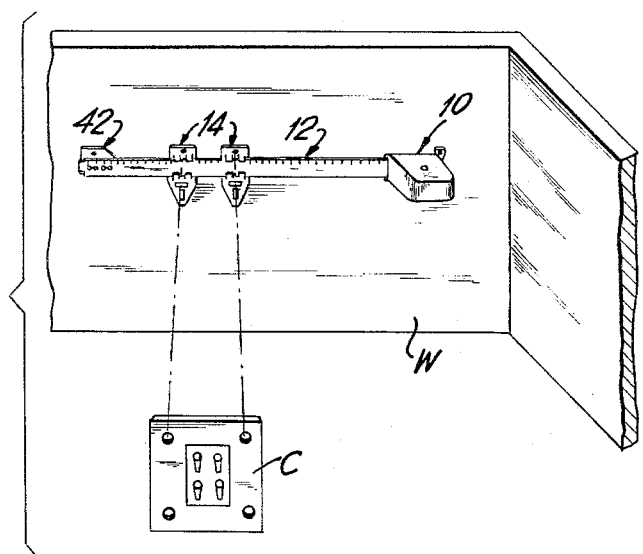
FIG. 9 is a pictorial view illustrating one possible application of the present invention.

In FIG. 9, there is pictorially shown a practical application of one embodiment of the present invention. For purposes of illustration, a cover plate C for a switch panel is shown. The location of the mounting holes relative to each other is determined by use of the slide members in the manner described hereinabove. The layout tool is then removably secured to wall W by means of fasteners such as nails extending through the aperture in the housing tab and the end clip tab, at the same time making certain that the tool is horizontal by utilizing the bubble levels. The hole spacing of the cover may then be transferred to the wall by means of a punch. It will be evident then that one man can accurately and rapidly do the job with a single, compact tool whereas before it was necessary to use several tools and, where the mounting holes were widely spaced, two men were required.

The combination of devices described hereinabove and illustrated in the drawing provides several different combinations of tools each having great utility. A heretofore large and bulky tool such as a carpenter's square that could not be stored in a tool chest because the legs thereof may be as long as 24" may now be packaged so as to require very little more space than a pair of coiled flexible tapes. Measurement transfer means adapted to transfer very large dimensions by only one man are now conveniently combined with a horizontal and vertical level.

With regard to the cost factor, one or more inexpensive clips accomplish the task of converting a conventional measuring tape into a combination tool. The clips are universal to the extent that they may be used to provide several combinations of tools. With the features of the present invention, one man only is required to do a job that previously needed two or more men. Long lines in either of the horizontal or vertical planes may be laid out by utilizing the extensible characteristic of the present invention together with one of the wall hanging features.

There has been disclosed heretofore the best embodiments of the invention presently contemplated and it is to be understood that various changes and modifications may be made by those skilled in the art without departing from the spirit of the invention.

What is claimed is:

1. A layout tool comprising:
   (a) a hollow housing having a base portion;
   (b) a flexible length of normally concave-convex, resilient metal tape coiled within said housing, said tape being adapted to be withdrawn from said housing, said tape having calibrated indicia marked thereon;
   (c) a pair of flat measurement transfer slides having means integral therewith for maintaining said slides perpendicular to said tape in the plane thereof, said slides being movably mounted on said tape, said slides being frictionally engaged by the inherent resiliency of said normally concave tape said slide members being adapted to flatten said tape at the point of contact therewith to thereby increase the gripping action therebetween; and
   (d) level indicating means carried by each said slide for indicating the alignment of said tape in either of two perpendicular planes relative to the direction of the force of gravity.

2. The layout tool in accordance with claim 1 wherein said slides include a pin adapted to extend rearwardly from said tape.

3. The layout tool in accordance with claim 1 wherein each said slide includes an aperture proximate one end thereof.

4. The layout tool in accordance with claim 1 including a clip member removably attached to the free end of said tape.

5. The layout tool in accordance with claim 4 wherein said clip member is provided with a rearwardly extending pin and an aperture, said clip member thereby being adapted to cooperate with said slide whereby a given dimension may be transferred from one surface to another.

6. The layout tool in accordance with claim 1 wherein said slides are each provided with a plurality of tabs defining a first channel adapted to slidably receive both longitudinal edges of said tape, said first channel being sufficiently long to prevent rocking of said slide with respect to said tape.

7. The layout tool in accordance with claim 6 wherein said slides are further provided with a pair of downwardly and inwardly projecting opposed flanges on the rear surface thereof, said flanges defining a second channel disposed at right angles to said first channel, said flanges being adapted to slidably receive the longitudinal edges of a second flexible tape similar in construction to said aforementioned flexible, coiled tape.

8. An attachment in combination with a resilient, flexible, coiled metal tape having a concave-convex cross section, the tape being adapted to be withdrawn from and retracted into a housing, said attachment comprising:
   (a) a flat body member having a plurality of tabs formed integrally with the top surface thereof, said tabs defining a channel adapted to slidably receive the flexible tape, said body member being in frictional engagement with the resilient tape whereby said body member flattens the tape at the point of contact therewith and is maintained perpendicular with respect to the tape, said body member being provided with an aperture therethrough whereby when said body member is moved along the tape the dimension between the aperture and a reference point on the housing may be determined and transferred to a work surface; and
   (b) means carried by said body member for indicating when said length of tape is horizontal and when it is vertical.

9. The attachment in accordance with claim 8 wherein said body member includes a pin adapted to extend rearwardly therefrom, said pin cooperating with a reference point on the housing whereby the dimension therebetween may be determined and transferred to a work surface.

10. The attachment in accordance with claim 8 wherein said body member includes a pair of downwardly and inwardly projecting opposed flanges on the rear surface thereof, said flanges defining a second channel at right angles to the aforesaid channel, said second channel being adapted to slidably receive a second length of flexible tape whereby a combination tool including a square is formed.

References Cited by the Examiner

UNITED STATES PATENTS

| | | | |
|---|---|---|---|
| 360,247 | 3/1887 | Reichenbach | 33—207.2 |
| 970,641 | 9/1910 | O'Neil | 33—158 |
| 1,988,095 | 1/1935 | Stockman | 33—27 |
| 2,542,561 | 2/1951 | Olejniczak | 33—207 X |
| 3,175,296 | 3/1965 | Gladbury | 33—173 X |

FOREIGN PATENTS 5,372      1909      Great Britain.

ISAAC LISANN, *Primary Examiner.*

H. N. HAROIAN, *Assistant Examiner.*